Feb. 22, 1949.  W. J. O'BRIEN  2,462,764
NAVIGATION SYSTEM
Filed June 3, 1946  4 Sheets-Sheet 1

INVENTOR.
William J. O'Brien

FIG. 4.

Patented Feb. 22, 1949

2,462,764

UNITED STATES PATENT OFFICE 2,462,764

NAVIGATION SYSTEM

William J. O'Brien, London, England, assignor to The Decca Record Company, Limited, London, England, a corporation of Great Britain Application June 3, 1946, Serial No. 673,952

7 Claims. (Cl. 343—105)

My invention relates to a radio frequency navigational system and has particular reference to a system embodying means for identifying particular sectors, areas or lanes and distinguishing these lanes from each of a plurality of other lanes produced by the normal operation of the navigational system.

In my copending application Serial No. 612,987, filed August 27, 1945 and entitled "Navigation system," I have disclosed a radio frequency navigational aid which includes means for continually apprising the operator of the vehicle equipped with suitable receiving apparatus of the geographical location of the vehicle. In my copending applications Serial No. 612,999, filed August 27, 1945 and entitled "Area identification system," and Serial No. 673,951, filed June 3, 1946 and entitled "Area identification system," I have pointed out the need for a sector or lane identification system and have disclosed in that application a number of methods by which a sector or lane identification may be obtained.

In the operation of a navigation system of the character disclosed in my first aforementioned copending application, greater precision and accuracy in the determination of the geographical location of the vehicle during the normal operation of the system is obtained by spacing the transmitting antenna at relatively great distances. However, phase shifts resulting from reflected sky waves particularly during night operation definitely limit the maximum spacing which may be used and still maintain a proper phase lock among the various transmitting components.

The present invention is directed to a transmitting system which permits a much greater antenna spacing to be utilized with the attendant realization of greatly improved accuracy of position indication, and is directed also to a novel form of lane or sector identification which provides the operator of the mobile vehicle with an identification of the particular lane passing through his geographical location under circumstances where a plurality of lanes would otherwise satisfy the observed conditions.

It is, therefore, an object of my invention to provide an area or lane identification system for use with radio frequency navigational systems and which operates from time to time to identify the area, sector or lane within which the vehicle is moving.

It is also an object of my invention to provide an identification system of the character set forth in the preceding paragraph in which sector identification is provided by periodically subjecting the navigation system transmitting apparatus to an alternative mode of operation.

It is additionally an object of my invention to provide a system and apparatus of the character hereinbefore mentioned which includes a lane indicator in addition to the two coordinate indicators normally forming a part of the navigational aid.

It is a still further object of my invention to provide a lane identification system of the character hereinbefore set forth in which the alternative mode of transmitter operation is characterized by the employment of a minimum number of radiated frequencies.

It is an additional object of my invention to provide a system of the character set forth in the preceding paragraphs in which the two patterns defining the coordinate systems are established by pairs of transmitters wherein one pair operates independently of the other.

It is also an object of my invention to provide a navigation system of the character set forth hereinbefore in which relatively great spacing of the transmitters forming each pair is obtained by interposing a master station between each of the transmitting pairs and establishing a phase lock between the signals radiated from the two transmitters constituting the pair by maintaining a fixed multiple phase relation between each of the radiated signals and the signal generated at the master station.

Other objects and advantages of my invention will be apparent from a study of the following specifications, read in connection with the accompanying drawing, wherein.

Figure 1:
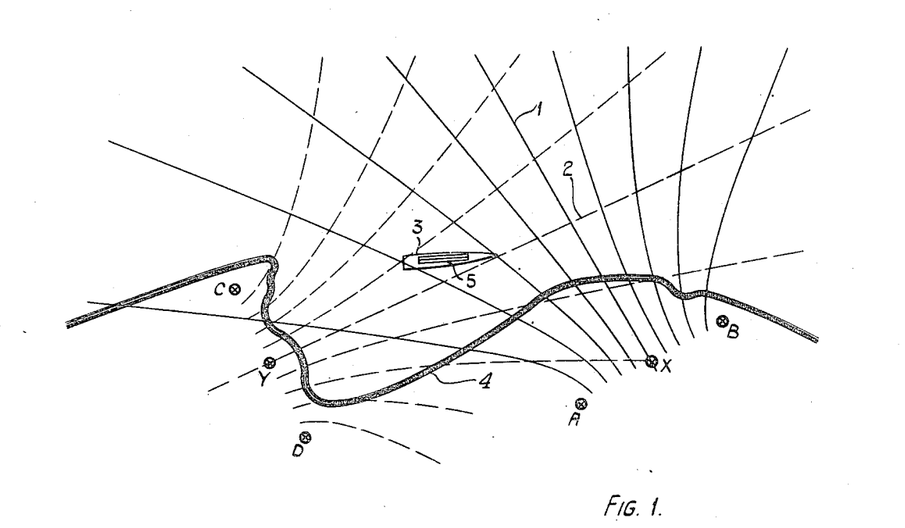
Fig. 1 is a diagram representing the transmitter locations and the hyperbolic systems produced by the normal operation of the disclosed navigational system.

Referring to the drawings, I have illustrated in Fig. 1 four radio frequency transmitters with transmitting antennae spaced from each other and represented by the reference characters A, B, C and D. In accordance with the disclosure contained in my aforementioned copending applications, transmitters A and B and transmitters C and D are continuously operated at different but related frequencies to transmit signals bearing a fixed multiple phase relation to each other to thereby establish overlapping and intersecting field patterns defining a coordinate system comprising contours 1 and 2 of equal multiple phase displacement.

In Fig. 1 the contour lines 1 and 2 are intended to represent the locus of all points along which an inphase relation exists as between the transmissions from antennae A and B and as between the transmissions from C and D, respectively. If the navigational system is to be used for guiding the navigation of surface vessels such as, for example, the ship 3 shown in Fig. 1, the transmitters A, B, C and D are, by preference, located along or near the shoreline 4, and the vessel 3 will be equipped with suitable receiving apparatus including a receiving antenna represented at 5. With the apparatus disclosed herein, there is provided for the operator of the vehicle or vessel 3 a continuous indication of the vehicle's location in terms of the equi-phase field coordinate system represented by the lines 1 and 2 in Fig. 1.

For the purpose of simplifying the ensuing description, the sector-like area containing between adjacent contour lines 1 and having an angular scope of 360 electrical degrees will be termed a "lane" as will all the sector-like areas disposed between adjacent contour lines 2. Furthermore, since the navigational pattern is developed by a chain of four transmitters A, B, C and D, the pattern produced by the A and B transmissions will be termed the "red link" while that produced by the radiations from transmitters C and D will be termed the "green link." Furthermore, a motion or displacement of the vehicle 3 a distance sufficient to change the distance from the vehicle to a selected transmitter an amount equal to $1/360$ of the wavelength of the fundamental frequency of which all of the radiated signals are harmonics will be termed a "unit displacement." Similarly a spacing between transmitters sufficient to require one millisecond for signals radiated from one of the transmitters to travel to the other transmitter of that pair will be termed a "unit spacing."

According to the first embodiment of my invention the normal operation of the navigational system consists in continuously radiating from antenna A the 48th harmonic of a given fundamental frequency, while there is simultaneously radiated from antennae B, C and D the 72nd, 50th and 75th harmonics, respectively. For the purpose of explanation, a fundamental frequency of 1 kilocycle has been assumed so that the frequencies radiated from antennae A, B, C and D are, respectively, 48, 72, 50 and 75 kilocycles. As will be pointed out hereinafter, the 48 and 72 kilocycle transmissions from transmitters A and B are phase locked to maintain a fixed and unchanging multiple phase relation. A similar phase lock is applied between the signals transmitted from antennae C and D. By this means a fixed equi-phase field pattern is established in space which may be employed to guide the navigation of vehicles through use of receiving equipment which will be described later.

Figure 2:
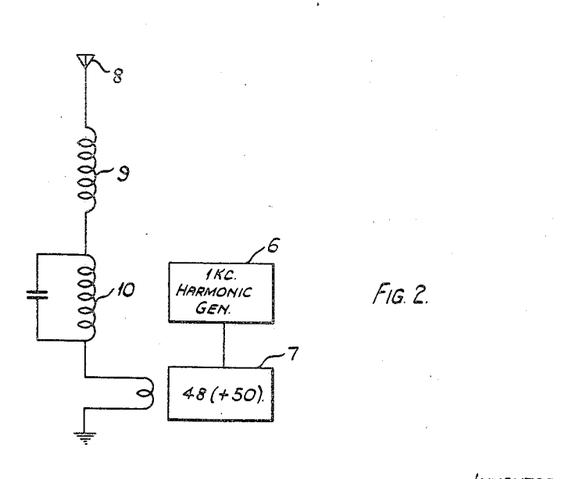
Fig. 2. is a block diagram illustrating the equipment comprising one of two master transmitters employed in the first embodiment of my invention.

The transmitting equipment such as may be employed for transmitter A is illustrated in Fig. 2 as consisting of a harmonic generator 6 tuned to the assumed fundamental frequency of 1 kilocycle and having the property of generating a fundamental signal which is rich in the higher harmonics. Any suitable generator of the required characteristics may be employed, but a preference is expressed for the signal generator of the character disclosed in my copending application Serial No. 612,988, filed August 27, 1945 and entitled "Signal generator."

The output of the generator 6 is applied to the input of suitable amplifying equipment 7 tuned to 48 kilocycles and serving to excite transmitting antenna 8 through an antenna circuit including tuning components 9 and 10 serving to, in effect, tune the antenna 8 to 48 kilocycles and also to 50 kilocycles for a purpose to be explained hereinafter.

Figure 3:
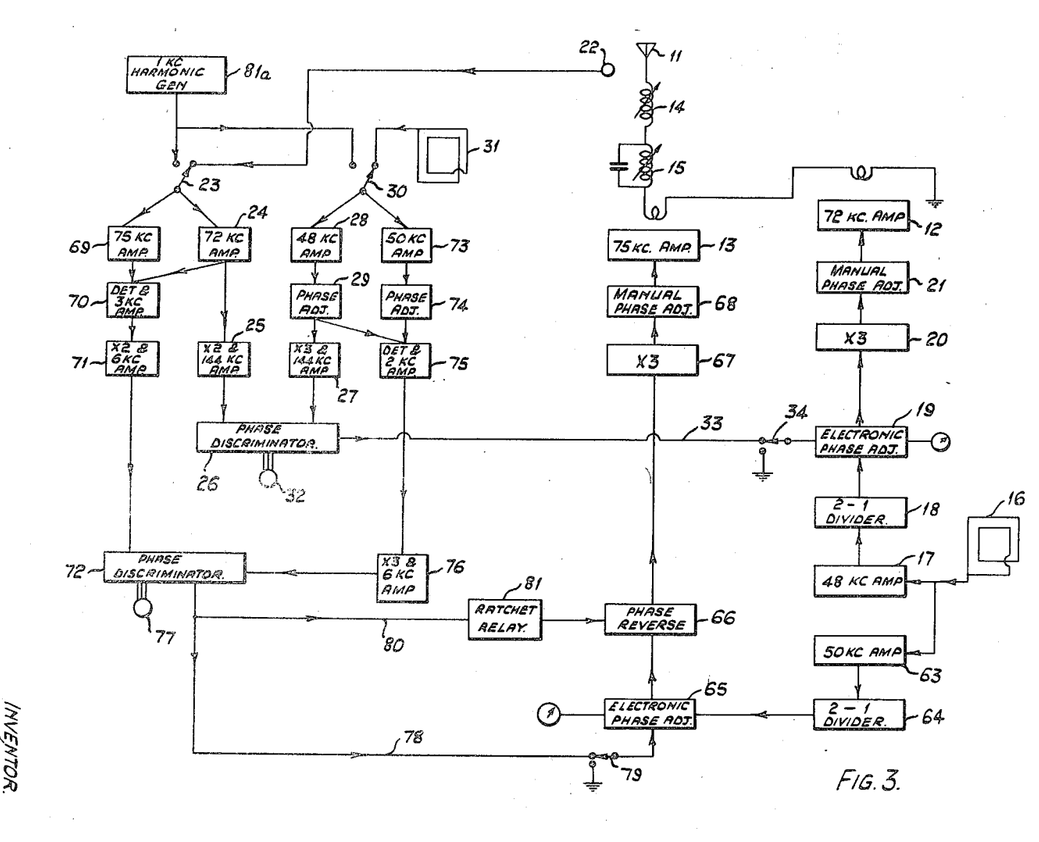
Fig. 3 is a block diagram illustrating the apparatus comprising each of the two slave transmitters employed in the first embodiment of my invention.

In Fig. 3 I have illustrated slave transmitting equipment such as is used for transmitter B and such as may be used for transmitter D. This equipment comprises a transmitting antenna 11 which is coupled to be excited at 72 kilocycles from a power amplifier 12 and for a purpose to be explained hereinafter at 75 kilocycles by a power amplifier 13. For the purpose of tuning the antenna 11 to both of these frequencies, the antenna circuit includes tuning components 14 and 15. The 72 kilocycle amplifier 12 is arranged to be excited by signals derived from transmitter A and received by a receiving loop antenna 16. The antenna 16 is coupled to the input circuit of a 48 kilocycle amplifier 17, the output of which is fed to a divider circuit 18 operating to produce a 24 kilocycle output. The output of the divider 18 is passed through an electronic phase adjustor 19 and applied to the input circuit of a frequency trebler 20. The 72 kilocycle output of the trebler 20 is passed through a manual phase adjustor 21 and to the input of the 72 kilocycle amplifier 12.

For the purpose of establishing and holding a fixed multiple phase relation between the 48 kilocycle signals radiated from antenna 8 and the 72 kilocycle signals radiated from antenna 11, I provide a small pick-up loop 22 which is coupled through a normally closed switch 23 to the input circuit of a 72 kilocycle amplifier 24. The output of this amplifier is connected to the input of a frequency doubling circuit 25, the 144 kilocycle output of which is applied to input circuit of a phase discriminator 26. The other input circuit of the phase discriminator 26 is connected to the output of a frequency trebling circuit 27 which produces a 144 kilocycle output in response to a 48 kilocycle input derived from the output circuit of a 48 kilocycle amplifier 28 and passed through a manual phase adjustor 29.

The input circuit of the amplifier 28 is connected through a normally closed switch 30 to a receiving loop antenna 31 which receives 48 kilocycle signals radiated from antenna 8. The phase discriminator 26 thus operates to measure the multiple phase relation between the 48 kilocycle signal received from antenna 8 and the 72 kilocycle signal picked up by the receiving loop 22 from the transmitting antenna 11. The result of this phase measurement is indicated by a phase indicator 32 coupled to the phase discriminator 26.

The phase discriminator 26 produces a direct control potential which varies in accordance with variations in the measured phase relation. This potential is coupled as indicated at 33 through a normally closed switch 34 to the electronic phase adjustor 19 in such a manner as to shift the phase of the signals passed through the phase adjustor 19 in a direction to oppose phase shifts measured by the discriminator 26 and resulting in a change in the control potential applied to the electronic phase adjustor 19. By this means a fixed and unchanging multiple phase relation is produced between the 48 and 72 kilocycle signals radiated, respectively, by transmitters A and B.

The apparatus shown in Fig. 2 may also be used as transmitter C by operating the equipment to normally radiate 50 kilocycle signals. Similarly, the above described portion of the apparatus shown in Fig. 3 may be used as the transmitting equipment for transmitter D by changing the tuning of the respective components from 48, 72 and 144 kilocycles to 50, 75 and 150 kilocycles, respectively.

Figure 4:
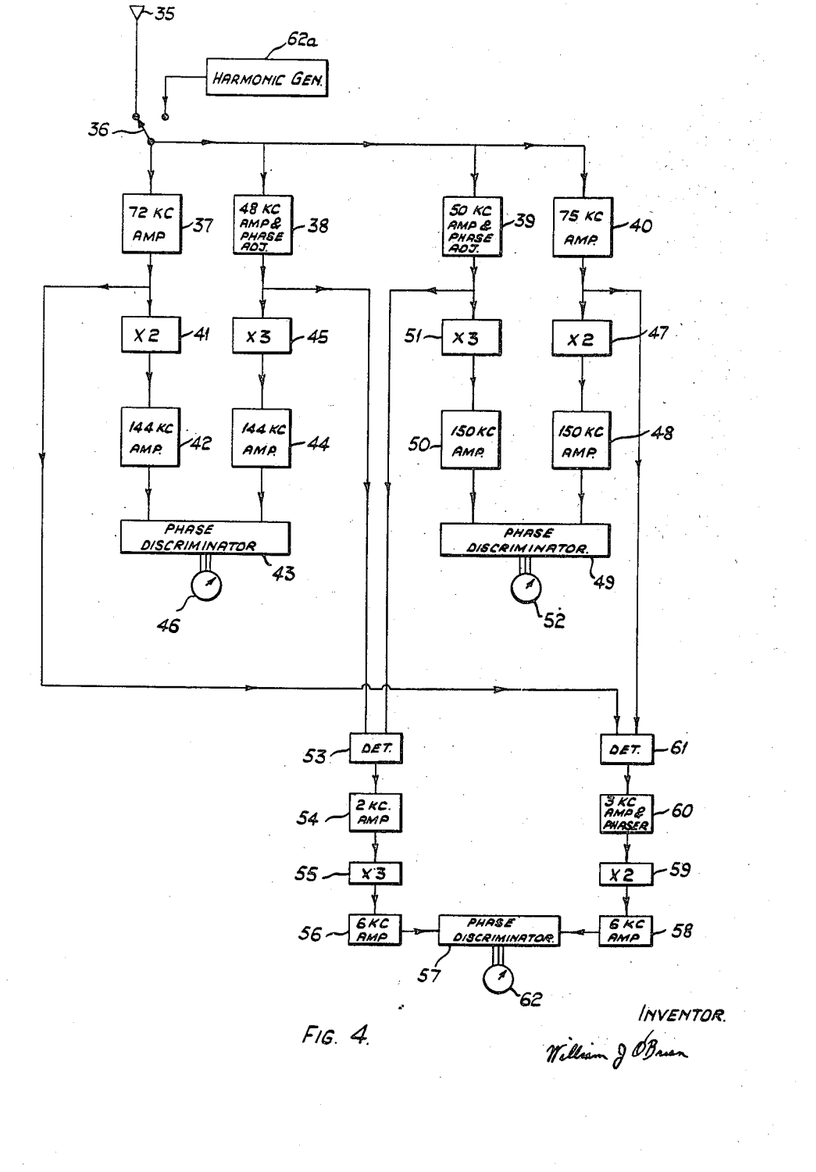
Fig. 4 is a block diagram illustrating a form of receiving apparatus which may be used to receive the signals radiated between transmitting equipment shown in Figs. 2 and 3 and which also includes means for giving a lane identification.

I have, in Fig. 4, illustrated receiving apparatus which may be used to receive the signals transmitted by transmitters A, B, C and D and which provides for indicating continuously the geographical location of the receiver in terms of the equi-phase displacement coordinate system produced through operation of the four transmitters. The receiving apparatus includes a receiving antenna 35 which is coupled through a normally closed switch 36 to the inputs of four radio frequency amplifiers 37, 38, 39 and 40 tuned, respectively, to frequencies of 72, 48, 50 and 75 kilocycles corresponding to the frequencies transmitted by antennae B, A, C and D, respectively.

The output of the 72 kilocycle amplifier 37 is doubled by a frequency doubling circuit 41 and the resulting 144 kilocycle signal is amplified by an amplifier 42 and applied to one input circuit of a phase discriminator 43. The other input circuit of the phase discriminator 43 is coupled to the output of a 144 kilocycle amplifier 44, the input of which is coupled to the output of a frequency trebling circuit 45, the input of which is coupled to the output circuit of the 48 kilocycle amplifier 38. A phase indicator 46 is operatively coupled to the phase discriminator 43 and serves to indicate the multiple phase relation existing between the 48 and 72 kilocycle signals at the location of the receiver. This is therefore an indication of the location of the receiver in one lane of the red link comprising the transmitters A and B.

In a like manner the 75 kilocycle amplifier 40 is coupled to a frequency doubler 47 which applies a 150 kilocycle signal to the input circuit of an amplifier 48, the output of which is coupled to one input circuit of a phase discriminator 49. The other input circuit of the phase discriminator 49 is connected to the output circuit of a 150 kilocycle amplifier 50. The input circuit of this amplifier is coupled to the output of a frequency trebler 51, the input of which is connected to the output of the 50 kilocycle amplifier 39. A phase indicator 52 is operatively connected to the phase discriminator 49 to indicate the multiple phase relation existing between the 50 and 75 kilocycle signals at the location of the receiver. The phase indicator 52 thus serves to indicate the geographical location of the receiver within one of the plurality of lanes established by the green link comprising transmitters C and D.

In accordance with the first embodiment of my invention an alternative mode of transmitter operation serves to provide a means of identifying which of the red and green lanes passes through the location of the receiver.

Preferably the transmitting equipment is operated in accordance with the following schedule:

|  | Normal | First Mode | Second Mode | Normal |
|---|---|---|---|---|
|  | Kc. |  |  | Kc. |
| Red Link: |  |  |  |  |
| Trans. A | 48 | 48 and 50 kc. | off | 48 |
| Trans. B | 72 | 72 and 75 kc. | do | 72 |
| Green Link: |  |  |  |  |
| Trans. C | 50 | off | 50 and 48 kc. | 50 |
| Trans. D | 75 | do | 75 and 72 kc. | 75 |

As during the normal transmissions, a fixed multiple phase relation is established between the 48 and 72 kilocycle signals and between the 50 and 75 kilocycle signals during the first and second alternative modes of transmitter operation. Furthermore, a multiple phase relation is established and maintained between the 48 and 50 kilocycle signals and between the 72 and 75 kilocycle signals. During the first mode of alternative transmitter operation, a beat note of 2 kilocycles is obtained by heterodyning the 48 and 50 kilocycle signals and a 3 kilocycle beat note by heterodyning the 72 and 75 kilocycle signals. These beat notes are subjected, respectively, to a frequency trebling and a frequency doubling operation to produce common comparison signals having a frequency of 6 kilocycles, at which frequency the phase relation is measured.

In the case of the red link this phase comparison is made at 6 kilocycles as compared with the 144 kilocycles at which the normal red lane indication is given. The 6 kilocycles determination is therefore twenty-four to one less sensitive than the normal indication and so serves to identify one lane out of a group of 24. During the second mode of alternative operation the signals are heterodyned and the resulting beat notes doubled and trebled as just described to permit a second phase comparison to be made at a 6 kilocycle comparison frequency. The normal green lane indication is obtained by a phase comparison made at 150 kilocycles so that the green lane identification is twenty-five to one less sensitive than the normal indication serving to therefore identify one lane of a group of 25 lanes.

The receiving apparatus for obtaining this mode of operation is illustrated in Fig. 4 as comprising a detector circuit 53 within which a portion of the 48 kilocycle output from amplifier 38 and a portion of the 50 kilocycle output from amplifier 39 is mixed and rectified. The resulting 2 kilocycle output signal is amplified in an amplifier 54 and trebled in a frequency trebling circuit 55. The resulting 6 kilocycle signal is amplified in a 6 kilocycle amplifier 56, the output of which is coupled to one input circuit of a phase discriminator 57. The other input circuit of a phase discriminator 57 is coupled to the output of a second 6 kilocycle amplifier 58. This amplifier is driven by a 6 kilocycle signal obtained from a frequency doubling circuit 59 which is excited by a 3 kilocycle signal produced at the output terminal of a 3 kilocycle amplifier 60.

The 3 kilocycle signal for the amplifier 60 is derived from a mixer and detector circuit 61, the inputs of which are coupled, respectively, to the output circuits of amplifiers 37 and 40. A lane indicator 62 of the phase meter type is operatively connected to the phase discriminator 57 to indicate the measured phase relation between the two 6 kilocycle signals applied to the two inputs of the phase discriminator 57.

Initial adjustment of the receiver is made by throwing the switch 36 to its alternate position connecting the input circuits of the amplifiers 37, 38, 39 and 40 to a 1 kilocycle harmonic generator 62a which produces an output signal rich in harmonics and characterized by bearing a fixed multiple phase relation to each other. With the switch 36 in such alternate position, the phase adjusters included in the amplifiers 38 and 39 are adjusted to produce a zero reading on each of the meaters 46, 52 and 62. The operation of the receiver can be periodically checked at subsequent times by merely throwing the switch 36 to said alternate position to check for zero reading on the three meters. The phase adjustors included in the amplifiers 38, 39 and 60 may be employed to bring the readings to zero whenever spurious phase shifts introduce erroneous indications.

It will be noted that the phase discriminator 57 and lane identification meter 62 operate identically during the first and second alternative modes of transmitter operation and that the difference in indication given results from the difference in transmitter location from which the signals originate. It is also to be pointed out that during the first mode of alternative transmitter operation the red lane indicator 46 provides a normal indication, while during the second alternative mode of operation the green lane indicator gives a normal green lane indication. Thus the percentage of time during which the normal indicators 46 and 52 are inoperative is maintained at a minimum. Furthermore, it will be noted that during the first mode of transmitter operation the green lane indicator is operative, though providing an incorrect indication while the same is true of the red lane indicator during the second mode of alternative transmitter operation. While during these brief periods the indicators give erroneous indications, they are nevertheless maintained in an operative condition so that a loss of registration due to removal of torque from the instrument needles is avoided.

The manner in which the alternative modes of transmitter operation are obtained may be seen by having reference to Figs. 2 and 3. As was previously pointed out, the amplifier 7 employed in the equipment for transmitters A and C includes a 50 kilocycle channel in addition to the normal 48 in the case of transmitter A, and in the case of transmitter C includes a 48 kilocycle channel in addition to the normal 50 kilocycle channel. During the alternative modes of transmitter operation this additional channel is connected in the circuit so that 48 and 50 kilocycle signals are radiated simultaneously from antenna 8, thus meeting the scheduled operating conditions for antennae A and C.

Also as was previously pointed out, the slave drive equipment shown in Fig. 3 includes a 75 kilocycle power amplifier 13 for delivering 75 kilocycle signals to the transmitting antenna 11. The 75 kilocycle signals for exciting the power amplifier 13 are derived initially from 50 kilocycle signals radiated by antenna 8 and picked up on the receiving loop antenna 16. For this reason the antenna 16 is coupled also to the input of a 50 kilocycle amplifier 63, the output of which is coupled to the input of a frequency divider 64 operating to produce a 25 kilocycle output signal.

This 25 kilocycle output signal is passed through an electronic phase adjustor 65 and a phase reversing switch 66 and applied to the input of a frequency trebler 67. The resulting 75 kilocycle output of the frequency trebler 67 is passed through a manual phase adjustor 68 and applied to the input circuit of the 75 kilocycle power amplifier 13.

It is pointed out that since the 48 and 50 kilocycle signals radiated by antenna 8 are both derived from the harmonic generator 6, they, of necessity, bear a fixed multiple phase relation to each other. The required fixed multiple phase relation between the radiated 72 kilocycle and 75 kilocycle signals is, therefore, obtained by maintaining a fixed multiple phase relation between the 2 kilocycle beat note resulting from heterodyning the 48 and 50 kilocycle signals radiated from antenna 8 and the 3 kilocycle beat note resulting from heterodyning the 72 and 75 kilocycle signals radiated by antenna 11.

Accordingly, the pick-up loop 22 which is coupled through the normally closed switch 23 is connected also to the input of a 75 kilocycle amplifier 69. The output of this amplifier and a portion of the output of the 72 kilocycle amplifier 24 are applied to a mixer detector and 3 kilocycle amplifier 70, serving to produce a 3 kilocycle beat note output resulting from heterodyning the 72 kilocycle and 75 kilocycle input signals.

The 3 kilocycle output of the amplifier 70 is applied to a frequency doubling circuit 71 serving to produce a 6 kilocycle output signal which is applied to one input circuit of a phase discriminator 72. In a similar arrangement, the receiving loop antenna which is connected through the normally closed switch 30 is coupled also to the input circuit of a 50 kilocycle amplifier 73. The output of the amplifier 73 is passed through a manual phase adjustor 74 and applied to a mixer detector and 2 kilocycle amplifier circuit 75.

Also applied to an input circuit of the mixer is a 48 kilocycle signal taken from the load side of the manual phase adjustor 29 in the 48 kilocycle channel. The 2 kilocycle output signal from the circuit 75 resulting from the heterodyning of the 48 and 50 kilocycle signals is applied to a frequency trebling circuit 76 serving to produce a 6 kilocycle out put which is applied to the other imput circuit of the phase discriminator 72. The phase discriminator 72 operates to measure the phase relation between the two 6 kilocycle input signals. The measured phase relation is indicated on a phase indicator 77 operatively coupled to the phase discriminator 72.

The phase discriminator 72 operates also to produce a direct control potential, the magnitude of which varies in accordance with variations in the measured phase relation. This direct control potential is coupled as indicated at 78 through a normally closed switch 79 to the electronic phase adjustor 65 and operates to shift the phase of the signals passed through the phase adjustor 65 in such direction as to oppose phase changes detected by the phase discriminator 72, thus maintaining a fixed and unchanging multiple phase relation between the 72 and 75 kilocycle signals radiated by antenna 11.

It is to be noted that when the 50 kilocycle signals are first applied to the input circuit of the divider 64 by starting the transmission of 50 kilocycle signals from antenna 8, the divider circuit may synchronize in the desired phase relation or in a phase relation which is 180° displaced from the desired relation. In the event the undesired 180° shift occurs, the direct control potential produced by the phase discriminator 72 has a relatively large magnitude. This potential is applied as indicated at 80 to a ratchet relay 81 which is in turn coupled to operate the phase reverser 66. The resulting reversal of phase effected by the phase reverser 6 offsets and corrects for the synchronizing of the divider circuit 64 in the undesired alternative position; in the event the divider 64 synchronizes in the desired relation to the radiated signals, the direct control potential produced by the phase discriminator 72 is relatively low so that the ratchet relay 81 is not operated and the phase reverser 66 remains in its then position.

The charts which are to be used with the navigational system will ordinarily be prepared from calculated values of phase difference, and it is therefore necessary to standardize the operation of the transmitting equipment in such a way as to produce field patterns which agree with the charts.

For the purpose of standardization, a 1 kilocycle harmonic generator 81a is provided operating to produce a 1 kilocycle output sginal which is rich in harmonics and which signal is characterized by said harmonics bearing a fixed multiple phase relation to each other. The output of the generator 81a is connected to the normally opened contacts of the switches 23 and 30 so that by throwing these switches to their alternate positions, the output of the harmonic generator is fed to the 48, 50, 72 and 75 kilocycle amplifying channels to produce phase indications on the phase indicators 32 and 77.

In initially adjusting the equipment, the normal navigational pattern is first adjusted in the following manner:

The master and slave transmitters are switched on to each radiate single frequencies only according to the normal mode, and a receiver placed at a known location is placed in operation.

The phase meters of the receivers are read to determine the difference between the indicated phase and the chart value corresponding to the receiver location. Switches 23 and 30 are then thrown to their "reference positions" and phase adjuster 29 is manipulated to introduce the required phase shift. When the desired correspondence between the chart value and the receiver meter indication is obtained, the reading of the phase meter 32 in the "reference position" of the switches is noted for future checks.

The lane identification pattern is adjusted in a similar manner during the transmission of dual signals from the master and slave stations, the phase adjustments being made by means of phase shifter 74, and reference readings noted from phase meter 77.

The manual phase adjusters 21 and 68 may be used to maintain the electronic phase adjusters 19 and 65 in the midportion of their operating range as revealed by plate ammeters associated therewith.

Reference has been made hereinbefore to the desirability of increasing the spacing between antennae A and B and between the antennae C and D for the purpose of increasing the sensitivity of the system and the accuracy of the indications given by the normal red and green lane indicators.

I have illustrated in Fig. 1 two additional transmitters X and Y positioned midway between transmitters A and B and between transmitters C and D, respectively. The transmitters X and Y are used as master transmitters operating at relatively low power to excite their associated slave transmitters A, B and C, D. Proper phase lock between the transmitters of each pair is obtained by phase locking each of the transmitters to the associated master transmitter.

The system is intended to use the same receiving apparatus as with the previously described modification of my invention and of the character illustrated in Fig. 4. The red and green lane indication and the red and green lane identification is obtained in the receiving apparatus in a manner identical to that previously described. Transmitting apparatus suitable for use with the system is illustrated in Figs. 5 and 6, Fig. 5 illustrating equipment which may be used for the master transmitters X and Y, Fig. 5 specifically illustrating the equipment used for transmitter X, it being understood that by interchanging the frequency designation of the various components, the drawing becomes an illustration of the equipment used for transmitter Y.

Figure 5:
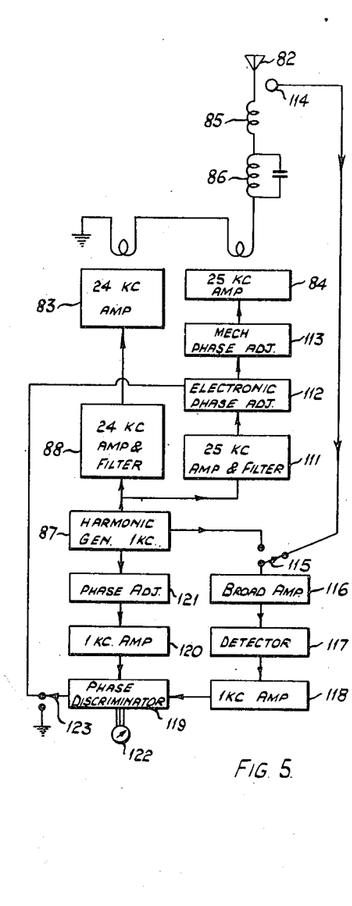
Fig. 5 is a block diagram illustrating the equipment comprising the two master transmitters employed in a second embodiment of my invention.

Referring now to Fig. 5, it will be seen that there is provided a transmitting antenna 82 which is connected to be excited at 24 kilocycles by a 24 kilocycle power amplifier 83. A 25 kilocycle amplifier 84 is also coupled to the antenna circuit for a purpose to be explained hereinafter. The antenna circuit includes tuning components 85 and 86 serving to, in effect, tune the antenna 82 to the two frequencies of 24 kilocycles and 25 kilocycles. The power amplifier 83 is excited from a harmonic generator 87 operating at a fundamental frequency of 1 kilocycle and generating a signal which is rich in the higher harmonics. The output of the generator 87 is coupled to a 24 kilocycle amplifier and filter 88, the output of which is coupled to the 24 kilocycle amplifier 83.

Figure 6:
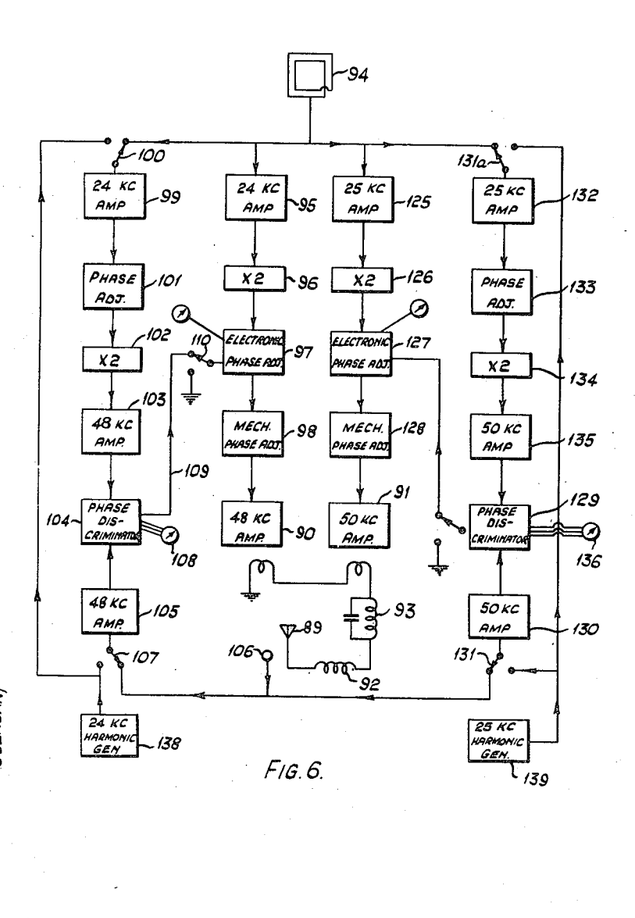
Fig. 6 is a block diagram illustrating the apparatus comprising the four slave transmitters employed in the second embodiment of my invention.

A slave drive equipment for transmitter A is illustrated in Fig. 6 as comprising a transmitting antenna 89 adapted to be excited at 48 kilocycles by a 48 kilocycle power amplifier 90. A 50 kilocycle power amplifier 91 is also provided for a purpose which will be explained hereinafter. Accordingly the circuit feeding antenna 89 is provided with tuning components 92 and 93 serving to, in effect, tune the antenna 89 at the two frequencies of 48 and 50 kilocycles. The power amplifier 90 is excited by signals derived from 24 kilocycle signals radiated from transmitter X and received on a receiving loop antenna 94. This antenna is coupled to the input of a 24 kilocycle amplifier 95, the output of which is applied to a frequency doubling circuit 96 serving to produce a 48 kilocycle output signal which is passed through an electronic phase adjustor 97 and a mechanical phase adjustor 98 to the input circuit of the 48 kilocycle amplifier 90. A fixed multiple phase relation between the 48 kilocycle signals radiated from antenna 89 and the 24 kilocycle signals radiated from antenna 82 is obtained through the automatic operation of the electronic phase adjustor 97.

The equipment for operating the phase adjustor 97 includes a 24 kilocycle amplifier 99 also coupled to the receiving antenna 94 through a normally closed switch 100. The output of the 24 kilocycle amplifier 99 is passed through a manual phase adjustor 101 to the input of a frequency doubling circuit 102, the 48 kilocycle output signal of which is applied to an amplifier 103.

The output of the amplifier 103 is connected to one input circuit of a phase discriminator 104. The other input circuit of the phase discriminator 104 is connected to the output circuit of a 48 kilocycle amplifier 105 which is excited from a small pick-up loop 106 placed near the transmitting antenna 89 and coupled to the amplifier 105 through a normally closed switch 107.

The phase discriminator 104 operates to determine the multiple phase relation between the 48 kilocycle signals radiated from antenna 89 and the 24 kilocycle signals radiated from antenna 82. The measured phase relation is indicated on a phase indicator 108 which is operatively connected to the phase discriminator 104. The phase discriminator 104 operates to produce a direct control potential which is coupled as shown at 109 through a normally closed switch 110 to the electronic phase adjustor 97 and operates in such manner as to produce phase shifts in the circuit extending through the phase adjustor 97 in opposition to phase shifts measured by the discriminator 104 and producing changes in the control potential applied as indicated at 109 to the electronic phase adjustor 97. By this means a fixed multiple phase relation is maintained between the 48 kilocycle signals radiated from antenna 89 and the 24 kilocycle signals radiated from antenna 82.

The slave drive equipment thus far described in connection with Fig. 6 may also be used as the transmitting equipment for transmitter B by substituting frequency trebling circuits for the frequency doublers 96 and 102 and 72 kilocycle amplifiers for the 48 kilocycle amplifiers 90, 103 and 105.

The radio frequency navigation system illustrated in Figs. 5 and 6 also provides for a lane identification by subjecting the transmitting equipment periodically to a plurality of alternative modes of operation. For lane identification purposes, the transmitters are preferably operated in accordance with the following schedule:

|  | Normal | First Mode | Second Mode | Normal |
|---|---|---|---|---|
|  | Kc. |  |  | Kc. |
| Red Link: |  |  |  |  |
| Trans. A | 48 | 48 and 50 kc. | off | 48 |
| Trans. X | 24 | 24 and 25 kc. | do | 24 |
| Trans. B | 72 | 72 and 75 kc. | do | 72 |
| Green Link: |  |  |  |  |
| Trans. C | 50 | off | 50 and 48 kc. | 50 |
| Trans. Y | 25 | do | 25 and 24 kc. | 25 |
| Trans. D | 75 | do | 75 and 72 kc. | 75 |

During the first alternative mode of transmitter operation, 25 kilocycle signals are radiated from antenna 82 simultaneously with the 24 kilocycle signals and 50 kilocycle signals are simultaneously radiated with 48 kilocycle signals from antenna 89.

In Fig. 5 I have illustrated the additional equipment required to excite the antenna 82 at 25 kilocycles. This equipment includes the power amplifier 84 previously mentioned. This amplifier is excited from the harmonic generator 87, a portion of the output of which is applied to a 25 kilocycle amplifier and filter 111, the output of which is passed through an electronic phase adjuster 112 and a mechanical phase adjustor 113 to the input of the amplifier 84. Provision is made for maintaining a fixed multiple phase relation between the simultaneously radiated 24 and 25 kilocycle signals. This equipment includes a pick-up loop 114 disposed near the transmitting antenna 82 and coupled through a normally closed switch 115 to the input of a broadly tuned amplifier 116 serving to amplify 24 and 25 kilocycle signals picked up simultaneously by the pick-up loop 114.

The output of the amplifier 116 is applied to a detector circuit 117 serving to produce a 1 kilocycle beat note resulting from the heterodyning of the 24 and 25 kilocycle signals. This 1 kilocycle beat note is amplified by a 1 kilocycle amplifier 118 and applied to one input circuit of a phase discriminator 119. The other input circuit of the phase discriminator 119 is driven by a 1 kilocycle amplifier 120, the input circuit of which is coupled through a phase adjustor 121 to the harmonic generator 87. The phase discriminator 119 thus serves to measure the phase relation between the 1 kilocycle beat note resulting from the heterodyning of the 24 and 25 kilocycle signals and the 1 kilocycle fundamental generated by the harmonic generator 87.

Shifts in the multiple phase relation between the radiated 24 and 25 kilocycle signals will produce a similar shift in the phase relation between the two 1 kilocycle input signals to the phase discriminator 89. This phase relation is indicated on a phase meter 122 operatively coupled to the phase discriminator 119. The phase discriminator 119 serves also to produce a direct control potential which varies in accordance with variations in the measured phase relation. This potential is applied through a normally closed switch 123 to the electronic phase adjustor 112 to introduce phase shifts in the 25 kilocycle channel in a direction and having a magnitude adjusted to offset changes in the multiple phase relation producing changes in the direct control potential. It is thus seen that the 24 and 25 kilocycle signals radiated from antenna 82 are caused to bear a fixed multiple phase relation to each other.

In Fig. 6 I have illustrated also the additional equipment required to simultaneously radiate from antenna 89 50 kilocycle signals in addition to the normal 48 kilocycle signals. This equipment includes a 25 kilocycle amplifier 124 coupled to the receiving loop antenna 94 and having its output connected to a frequency doubling circuit 126. The 50 kilocycle output produced by the frequency doubler is passed through an electronic phase adjustor 127 and a mechanical phase adjustor 128 and applied to the input circuit of the previously mentioned 50 kilocycle amplifier 91.

The electronic phase adjustor is controlled by a phase discriminator 129, one input circuit of which is connected to the output of a 50 kilocycle amplifier 130, the input of which is coupled through a normally closed switch 131 to the pick-up loop 106. The other input circuit of the phase discriminator 129 receives 50 kilocycle signals derived initially from the loop antenna 94 which is connected through a normally closed switch 131a to the input of a 25 kilocycle amplifier 132.

The output of the amplifier 132 is connected through a phase adjustor 133 to a frequency doubler 134. The 50 kilocycle output of the frequency doubler 134 is applied to the input circuit of a 50 kilocycle amplifier 135, the output of which is connected to the phase discriminator 129. The phase relation measured by the discriminator 129 is indicated on a phase meter 136 operatively connected thereto. The direct control potential produced by the discriminator 129 is applied through a normally closed switch 137 to the electronic phase adjustor 127 to so operate the adjustor as to maintain a fixed multiple phase relation between the 50 kilocycle signals radiated from antenna 89 and the 25 kilocycle signals radiated from antenna 82.

For the purpose of phase standardization, I have provided a 24 kilocycle harmonic generator 138 and a 25 kilocycle harmonic generator 139. The switches 100, 107, 110, 131, 131a and 137 are thrown to their alternate positions to render the electronic phase adjustors inoperative and to apply to each of the amplifiers standardized signals generated by the harmonic generators. The manual phase adjusters, 98, 101, 128 and 133 are then manipulated to lay the normal and identification patterns in the manner hereinbefore described. Meter readings taken on the phase meters 108 and 136 after adjustment provide standard reference readings for the detection of improper operation.

For using the equipment illustrated in Fig. 6 as the slave transmitter B, frequency treblers are substituted for the frequency doublers 126 and 134 and the 50 kilocycle amplifiers 91, 130 and 135 are replaced by 75 kilocycle amplifiers.

In a similar manner the transmitting equipment shown in Fig. 5 may be used for the master transmitter Y by substituting 25 kilocycle amplifiers for the 24 kilocycle amplifiers 83 and 88 and by substituting 24 kilocycle amplifiers for the 25 kilocycle amplifiers 84 and 111. Likewise, like changes in the tuning of the amplifiers and the multiplication ratio of the frequency multiplers shown in Fig. 6 will adapt that equipment for operation as transmitters C and D for producing 48, 50, 72 and 75 kilocycle output signals.

From the foregoing it will be observed that I have provided two similar radio frequency navigational systems, each of which is noteworthy for including a means for periodically giving a coarse lane identification amounting to an identification of one lane in twenty-four in the red link and one lane in twenty-five in the green link.

In the second described modification of my invention, I have shown how the space separation between the antennae of each transmitting pair may be materially increased by employing a master transmitter situated midway between the transmitters of each pair and operating at a sub-multiple of the frequencies radiated by the slave transmitters. In the second described modification of my invention I have also shown the equipment required for maintaining the required fixed multiple phase relation among all of the radiated signals.

While I have shown and described the preferred embodiment of my invention, I do not desire to be limited to any of the details of construction shown or described herein, except as defined in the appended claims.

I claim:

1. In a radio frequency navigational system, the combination of: means for radiating from two pair of spaced points two pair of radio frequency signals of four different frequencies; means for periodically arresting radiation from one of said pairs of points; means for radiating from the other of said pairs of points said two pair of radio frequency signals; and means for maintaining among all of said signals a fixed multiple phase relation.

2. In a radio frequency navigational system, the combination of: means for radiating from two pair of spaced points two pair of radio frequency signals of four different frequencies; means for periodically arresting radiation from one of said pairs of points; means for radiating from the other of said pairs of points said two pairs of radio frequency signals, said signals each being a different harmonic of a given fundamental frequency; and means for maintaining among all of said signals a fixed multiple phase relation.

3. In a radio frequency navigational system, the combination of: means for radiating from two pair of spaced points two pair of radio frequency signals of four different frequencies; means for periodically arresting radiation from one of said pairs of points; means for radiating from the other of said pairs of points said two pair of radio frequency signals, said signals each being a different harmonic higher than the forty-fifth of a given fundamental frequency; and means for maintaining among all of said signals a fixed multiple phase relation.

4. In a radio frequency receiver for use with a radio frequency navigational system operating to normally radiate from two pair of spaced points two pair of signals of different but related frequencies bearing a fixed multiple phase relation to each other and periodically operating to radiate said two pair of signals from one of said pairs of spaced points, and including means for receiving said signals and indicating the multiple phase relation between each of said pairs of signals, the combination of: means for heterodyning the lower frequency signals of each pair to produce one beat note; means for heterodyning the higher frequency signals of each pair to produce another beat note; frequency change means for bringing said beat notes to a common reference frequency; and means for measuring and indicating the phase relation at said reference frequency.

5. In a radio frequency navigational system, the combination of: means for radiating from two pair of spaced points two pair of signals of different but related frequencies; a pair of transmitting means, one disposed between each of said spaced points; means at said transmitting means for radiating signals having a frequency equal to sub-multiples of the frequencies of said pairs of signals; and means at each of said points for maintaining a fixed multiple phase relation between the signals radiated from said point and the signals radiated by the associated transmitting means.

6. In a radio frequency navigational system, the combination of: means for radiating from two pair of spaced points two pair of signals of different but related frequencies; a pair of transmitting means, one disposed between each of said spaced points; means at said transmitting means for radiating signals having a frequency equal to sub-multiples of the frequencies of said pairs of signals; means at each of said points for maintaining a fixed multiple phase relation between the signals radiated from said point and the signals radiated by the associated transmitting means; means for periodically arresting radiation from one of said transmitting means and from the associated spaced points; means for simultaneously radiating from the other of said transmitting means both of said sub-multiple frequencies; and means for simultaneously radiating from the associated points said two pair of radio frequency signals.

7. A radio receiver comprising means for simultaneously receiving four radio frequency signals of unlike but harmonically related frequencies bearing fixed multiple phase relations to each other, frequency converting means for producing from the first and second of said signals a first pair of reference potentials of like frequency, frequency converting means for producing from the third and fourth of said signals a second pair of reference potentials of like frequency, means for mixing the first and third of said signals to produce a beat note, means for mixing the second and fourth of said signals to produce another beat note, frequency converting means for producing from said beat notes a third pair of reference potentials of like frequency, and means for measuring and indicating the phase relation between the potentials of each of said three pairs of reference potentials.

WILLIAM J. O'BRIEN.

No references cited.